United States Patent
Saleh et al.

(10) Patent No.: US 10,710,609 B2
(45) Date of Patent: Jul. 14, 2020

(54) NOTIFICATIONS BASED ON GEO-FENCE AND VEHICLE AND DRIVER INFORMATION

(71) Applicant: Toyota Motor North America, Inc., Plano, TX (US)

(72) Inventors: Aghyad M. Saleh, Grand Prairie, TX (US); Joshua C. Batie, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/168,293

(22) Filed: Oct. 23, 2018

(65) Prior Publication Data

US 2020/0122742 A1    Apr. 23, 2020

(51) Int. Cl.
| | |
|---|---|
| *B60W 50/14* | (2020.01) |
| *G07C 5/00* | (2006.01) |
| *H04W 4/40* | (2018.01) |
| *G01S 5/00* | (2006.01) |
| *B60W 40/09* | (2012.01) |

(52) U.S. Cl.
CPC ............ *B60W 50/14* (2013.01); *B60W 40/09* (2013.01); *G01S 5/0027* (2013.01); *G07C 5/008* (2013.01); *H04W 4/40* (2018.02); *B60W 2050/143* (2013.01); *B60W 2050/146* (2013.01)

(58) Field of Classification Search
CPC ................ B60W 50/14; B60W 40/09; B60W 2050/143; H04W 4/40; G01S 5/0027; G07C 5/008
See application file for complete search history.

(56) References Cited

U.S. PATENT DOCUMENTS

| | | | |
|---|---|---|---|
| 6,009,374 A * | 12/1999 | Urahashi | B60K 31/0058 701/36 |
| 7,912,630 B2 | 3/2011 | Alewine et al. | |
| 9,467,515 B1 | 10/2016 | Penilla et al. | |
| 9,473,904 B2 | 10/2016 | Bennett | |
| 9,965,768 B1 | 5/2018 | Doane et al. | |
| 2012/0054028 A1 | 3/2012 | Tengler et al. | |
| 2014/0277828 A1 * | 9/2014 | Bullister | G07C 5/008 701/1 |
| 2015/0095156 A1 | 4/2015 | Sauerbrey et al. | |
| 2016/0076909 A1 * | 3/2016 | Klicpera | G06Q 50/06 73/198 |
| 2017/0078840 A1 * | 3/2017 | Saurav | H04W 4/021 |
| 2018/0025554 A1 | 1/2018 | Gibson et al. | |

* cited by examiner

*Primary Examiner* — Nader Bolourchi
(74) *Attorney, Agent, or Firm* — Haynes and Boone, LLP

(57) ABSTRACT

Methods and systems for managing notifications to be presented in a vehicle. Information is received wirelessly from a vehicle sensor system of the vehicle. The information includes position information and driver behavior information. A notification condition is detected based on the information. In response to a detection of the notification condition, a notification is selected to send to the vehicle based on the information. The notification is sent wirelessly to the vehicle for presentation via an output system in the vehicle.

20 Claims, 7 Drawing Sheets

NOTIFICATIONS BASED ON GEO-FENCE AND VEHICLE AND DRIVER INFORMATION

FIELD

The present disclosure generally relates to notifications for vehicles and, more particularly, to methods and systems for managing the presentation of notifications in a vehicle based on information received from the vehicle.

BACKGROUND

The location of a customer relative to a business entity is often used as a trigger for sending advertisements and deal alerts to the customer. Geo-fencing is one manner in which this type of marketing may be performed. Geo-fencing uses a geo-fence to trigger a certain response when a device, typically, a mobile device, enters or leaves a particular area. A geo-fence may be a virtual geographic boundary or virtual perimeter. One application of geo-fencing includes pushing advertisements for a store to a customer when the mobile device of that customer is detected within a geo-fence defined as the boundary extending one mile from the store. In other applications, advertisements may be pushed to a vehicle when the vehicle is detected within the geo-fence. However, some currently available methods and systems for marketing based on geo-fencing are limited in their ability to control the types of notifications that are presented to a customer.

SUMMARY

In one example embodiment, a method is provided for managing notifications to be presented in a vehicle. Information is received wirelessly from a vehicle sensor system of the vehicle. The information includes position information and driver behavior information. A notification condition is detected based on the information. In response to a detection of the notification condition, a notification is selected to send to the vehicle based on the information. The notification is sent wirelessly to the vehicle for presentation via an output system in the vehicle.

In another example embodiment, a method is provided for managing notifications to be presented in a vehicle. A notification manager receives position information and driver behavior information wirelessly from a vehicle sensor system of the vehicle. The notification manager detects whether the vehicle is positioned relative to a geo-fence using the position information. The notification manager forms a notification based on the position information, the driver behavior information, and selected notification material stored in a database in response to detecting that the vehicle is positioned relative to the geo-fence. The notification manager sends the notification wirelessly to the vehicle for presentation via an output system in the vehicle.

In yet another example embodiment, a system for managing notifications to be presented in a vehicle includes a database storing notification material and a notification manager. The notification manager is configured to receive information wirelessly from a vehicle sensor system of the vehicle, the information including position information and driver behavior information. The notification manager is configured to detect a notification condition based on the information. The notification manager is configured to select a notification from the notification material in the database to send to the vehicle based on the information in response to a detection of the notification condition. The notification manager is configured to send the notification to the vehicle wirelessly for presentation via an output system in the vehicle.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Figure 1:
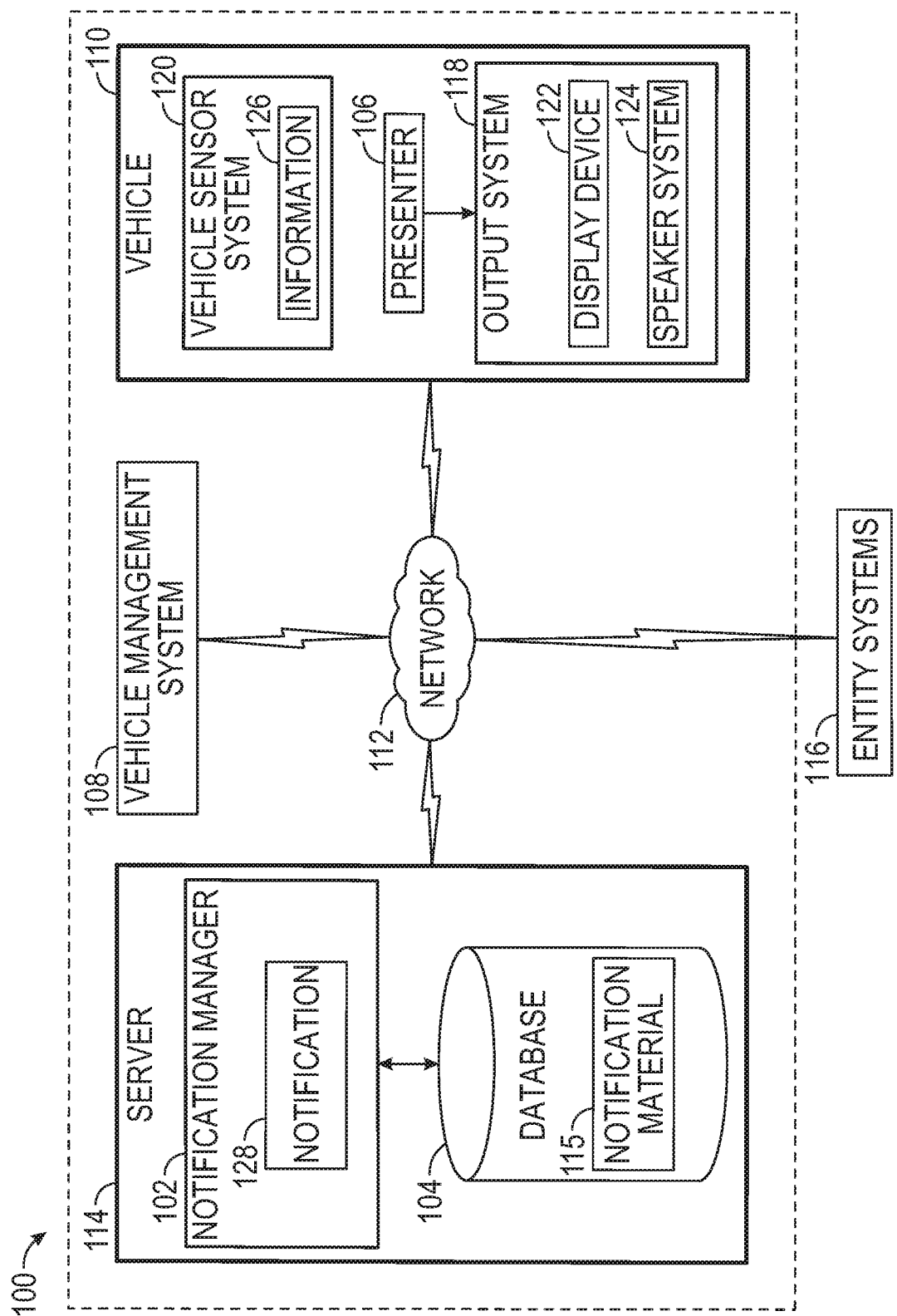
FIG. 1 is a block diagram depicting a notification system in accordance with an example embodiment.

Illustrative embodiments and related methods of the present disclosure are described below as they might be employed in one or more methods and systems for managing notifications to be presented in a vehicle. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

As described herein, methods and systems of the present disclosure use geo-fencing and advanced vehicle and behavioral computations to push notifications to an output system (e.g., display device) in a vehicle. A notification system may push notifications that include, for example, marketing notifications, coupons, deal alerts, marketing prompts, reports, other types of notifications, or a combination thereof. In some cases, the notifications may be tailored based on a particular driver's preselected preferences. A driver may, for example, opt-in or opt-out entirely or with respect to certain types of notifications. For example, a driver may opt-out of all lodging notifications but opt-in for all coffee shop notifications and gas station coupons. The notification system may use geo-fencing in conjunction with telematics and vehicle-generated information, as well as possibly information from external data sources (e.g., weather data, traffic data, etc.), to make decisions about the types of notifications to send to a vehicle for presentation to the driver of the vehicle.

In one or more example embodiments, a notification system receives position information and driver behavior information from a vehicle sensor system of the vehicle. The notification system detects whether the vehicle is positioned relative to a geo-fence using the position information. The notification system forms a notification based on the position information, the driver behavior information, and selected notification material stored in a database in response to detecting that the vehicle is positioned relative to the geo-fence. Forming the notification may include creating the notification based on the selected notification material or merely packaging the selected notification material, which may itself be a notification, for sending to the vehicle. The notification system sends the notification to the vehicle for presentation via an output system in the vehicle. For example, the notification may be displayed in a display device of the vehicle, which may be a head unit, a head-up display, or some other type of display device. Thus, the notification system provides a more customized way of managing the notifications that are sent to a driver based on information provided by the vehicle.

Referring now to the figures, FIG. 1 is a block diagram depicting a notification system 100 in accordance with an example embodiment. Notification system 100 is used to manage notifications that are to be presented in vehicles. Notification system 100 includes notification manager 102 and database 104. Optionally, notification system 100 may include the vehicles themselves or one or more components inside the vehicles. As one illustrative example, notification system 100 may include presenter 106 in vehicle 110. Additionally, notification system 100 may optionally include vehicle management system 108.

Notification manager 102, presenter 106, and vehicle management system 108 may be in communication with each other. For example, notification manager 102, presenter 106, and vehicle management system 108 may communicate using any number of wired, wireless, or optical communications links, or combination thereof. In one or more examples, notification manager 102, presenter 106, and vehicle management system 108 may communicate with each other over network 112. Network 112 may include any number of communications networks of any number of types and in any number of different configurations. For example, network 112 may include at least one of a local area network (WAN), a wide area network (WAN) (e.g., the Internet), a public network, a private network, a peer-to-peer network, a cellular network, some other type of radio communications network, or any other type of communications network.

Each of notification manager 102, presenter 106, and vehicle management system 108 may be implemented using software, hardware, firmware, or a combination thereof. In some examples, one or more of notification manager 102, presenter 106, and vehicle management system 108 may be implemented using a single processor or multiple processors in communication with each other. When multiple processors are used, these processors may be in communication with each other through at least one of a wired communications link, a wireless communications link, or some other type of communications link. In some examples, one or more of notification manager 102, presenter 106, and vehicle management system 108 may include various components that are in communication with each other through at least one of wired, wireless, or optical communications links.

In one illustrative example, notification manager 102 is implemented using server 114. Server 114 may be a physical server or a cloud server. In some examples, server 114 includes a processor, a memory, and a communications device. Server 114 may include any number of data stores including, for example, database 104.

Database 104 stores notification material 115. In some cases, notification material 115 may be provided by a plurality of entity systems 116 belonging to a corresponding plurality of entities. An entity may be, for example, a store, a restaurant, a coffee shop, a financial institution, an advertising agency, an internet-based entity, a vehicle dealership, a lodging establishment (e.g., hotel, motel, bed and breakfast, etc.), some other type of business entity, an organization, or some other type of entity that has notification material they would like presented to drivers of vehicles. An entity system of entity systems 116 may be, for example, a server, a computer, a processor, or some other type of system or device capable of communicating with notification manager 102 over network 112. In one or more examples, each of entity systems 116 may upload notification material 115 to notification manager 102 over network 112.

Vehicle 110 includes presenter 106, output system 118, and vehicle sensor system 120. In some examples, presenter 106 may be integrated as part of a Data Communication Module (DCM) in vehicle 110. Output system 118 may include display device 122, speaker system 124, or both. In some cases, output system 118 may include a haptic feedback system or some other type of output device. Display device 122 may be a head unit, a head-up display, a monitor, a touchscreen, or some other type of display device. Vehicle sensor system 120 may include any number of sensors, gauges, instruments, processors, or other types of devices inside or outside of vehicle 110 that are capable of providing information 126. Information 126 may include sensor data, measurements, metrics, processed sensor data, or information generated or computed based on other sensor data. Information 126 is used to control the type of notifications that are ultimately sent to vehicle 110 for presentation in vehicle 110. In some examples, output system 118, vehicle sensor system 120, or both may be considered part of notification system 100.

Notification manager 102 may receive information 126 generated by vehicle sensor system 120 for processing. In some examples, notification manager 102 may receive information 126 directly from vehicle 110 over network 112. In other examples, however, notification manager 102 may receive information 126 indirectly. For example, information 126 may be sent to vehicle management system 108, which then sends information 126 to notification manager 102. In some cases, information 126 is transformed, edited, organized, or otherwise processed by vehicle management system 108 prior to being sent to notification manager 102 for further processing.

Vehicle management system 108 may be operated by an entity that manages vehicle 110 or multiple vehicles that include vehicle 110. This entity may be, for example, a car fleet service, a vehicle dealership, a rental car agency, a transportation agency, a business entity, or some other type of entity. Vehicle management system 108 may be used to register vehicles via vehicle identification numbers (VIN) to track the information being generated by each vehicle. For example, once a vehicle, such as vehicle 110, is registered with vehicle management system 108 via the VIN of vehicle 110, vehicle management system 108 may begin receiving information 126 from vehicle 110 periodically (regularly or irregularly) or continuously. Vehicle management system 108 may then send information 126 to notification manager 102 periodically (regularly or irregularly) or continuously. Information 126 may be sent in its original form or may be processed by vehicle management system 108 prior to being sent to notification manager 102. In one illustrative example, vehicle management system 108 may receive information 126 every five seconds and then send information 126 to notification manager 102 immediately or with a delay of one to two seconds. In some cases, vehicle management system 108 may receive information from multiple vehicles and may send this information in batches at regular intervals to notification manager 102 for efficiency.

Notification manager 102 uses information 126 to determine whether a notification condition is identified or triggered. If a notification condition is triggered, notification manager 102 forms one or more notifications using information 126 and a selected portion of notification material 115 stored in database 104. As one illustrative example, based on information 126, notification manager 102 selects notification 128 from notification material 115. Notification manager 102 may then send notification 128 to presenter 106 in vehicle 110 for presentation to a driver of vehicle 110 via output system 118. For example, notification 128 may be visually displayed to the driver using display device 122, audibly presented to the driver using speaker system 124, or both.

In other illustrative examples, notification manager 102 sends notification 128 to vehicle 110 indirectly. For example, notification manager 102 may send notification 128 to presenter 106 of vehicle 110 through vehicle management system 108. Vehicle management system 108 may receive notification 128 and may send notification 128 to presenter 106 with or without first processing notification 128. In some cases, vehicle management system 108 may customize notification 128 based on other data stored about vehicle 110, the driver of vehicle 110, or both. In other cases, vehicle management system 108 may wait to receive multiple notifications from notification manager 102 to then send these notifications in one or more batches to presenter 106 for efficiency.

In this manner, notification system 100 allows control of the different types of notifications that are presented to the driver of vehicle 110. Although notification system 100 has been described as sending notification 128 to vehicle 110, in other examples, multiple notifications may be sent to vehicle 110 at a same time.

Figure 2:
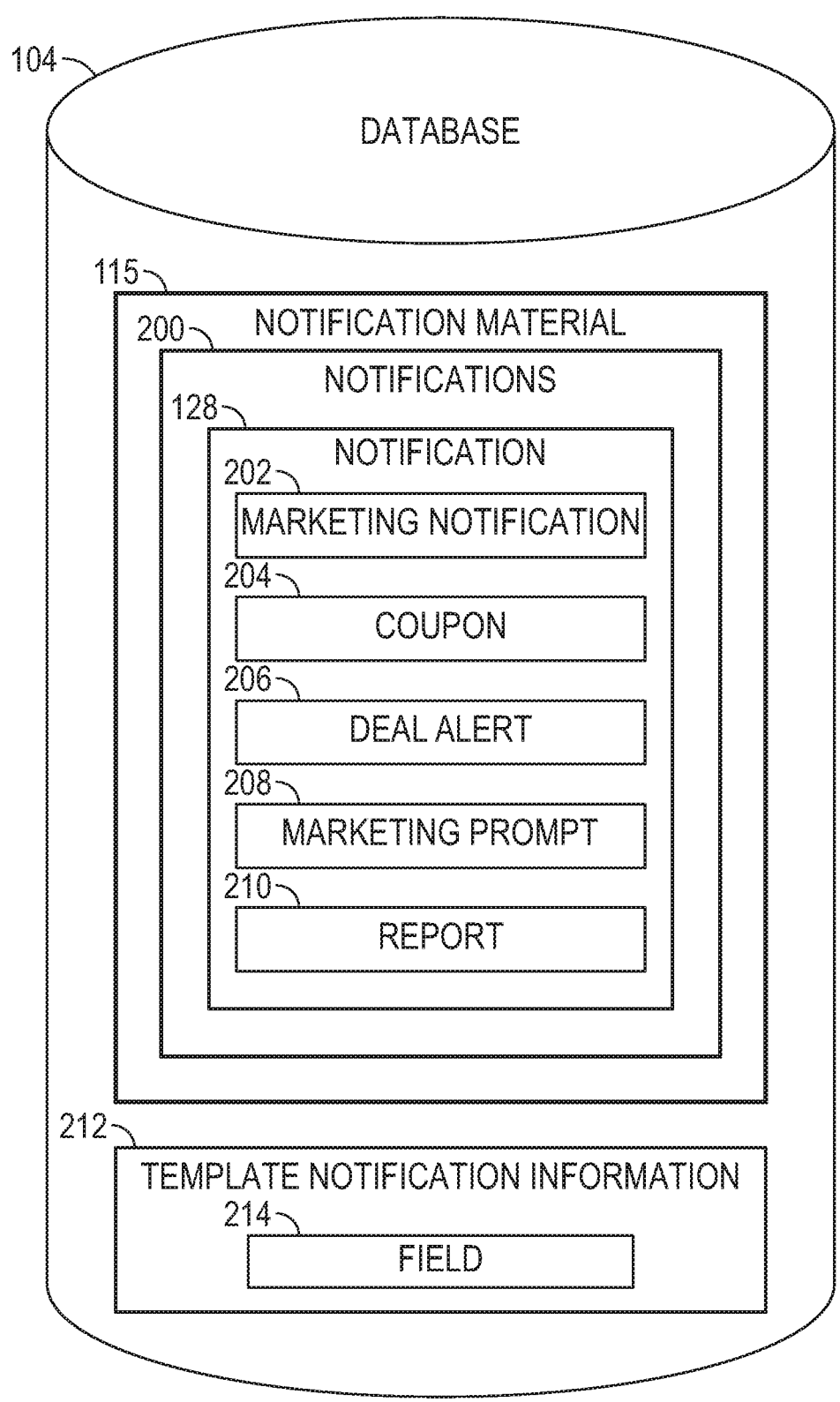
FIG. 2 is a block diagram of different types of notifications that may be included in the notification material stored in the database from FIG. 1 in accordance with an example embodiment.

FIG. 2 is a block diagram of different types of notifications 200 that may be included in notification material 115 stored in database 104 from FIG. 1 in accordance with an example embodiment. As shown in FIG. 2, notification material 115 may include notifications 200. In some examples, notification 128 in FIG. 1 may be an example of one of notifications 200. Notification 128 may take the form of marketing notification 202, coupon 204, deal alert 206, marketing prompt 208, report 210, some other type of notification, or a combination thereof.

Marketing notification 202 may be, for example, a general type of marketing notice or announcement that promotes a product, a service, or an event. Coupon 204 may be redeemable for a discount or rebate on any product, service, or ticket to an event that is purchased. Deal alert 206 may be, for example, an alert announcing a discounted price or other type of deal on one or more products, services, tickets, or combination thereof. Marketing prompt 208 may be a type of marketing notification that is meant to prompt for user input. Report 210 may be any type of accounting of an event or facts. Report 210 may include, for example, information on a sporting event, traffic, or weather that is meant to indirectly have a marketing effect.

In some cases, notification material 115 also includes template notification information 212. Template notification information 212 includes information that establishes a template for a notification. A notification may be created using template notification information 212 and then customized based on information about a vehicle, such as vehicle 110 from FIG. 1, information about the driver of the vehicle, or both. For example, template notification information 212 may identify marketing information as well as any number of fields that can be filled with information specific to vehicle 110, to the driver of vehicle 110, or to both. One such field, which may be field 214, may be fillable with a name of the driver of vehicle 110. In this manner, a notification created from template notification information 212 may be customized such that the notification addresses the driver by name.

In other examples, template notification information 212 may be used to customize notification 128. For example, template notification information 212 may include one or more rules for using information 126 received from vehicle 110 to customize what is included in notification 128.

Figure 3:
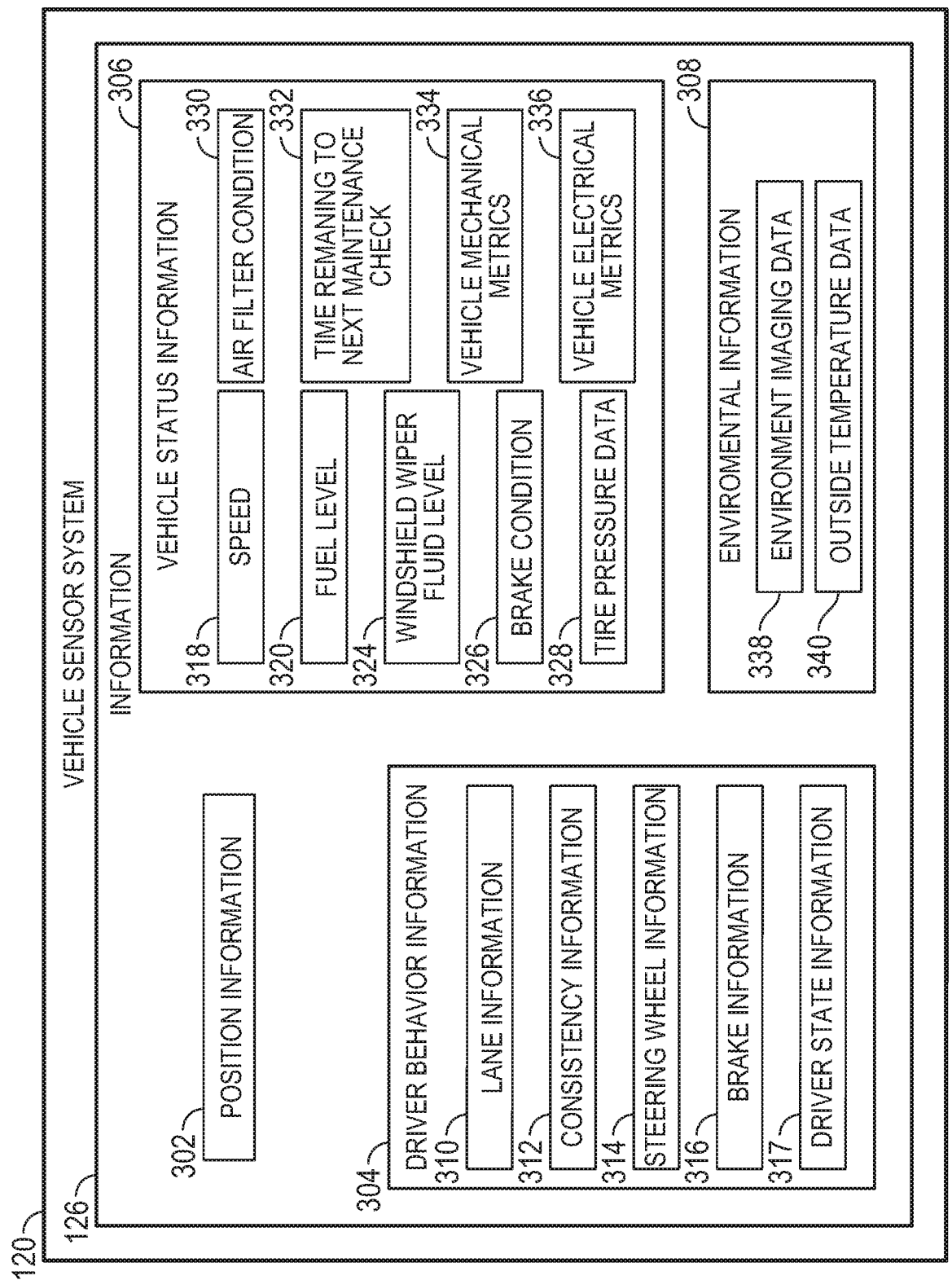
FIG. 3 is a block diagram of the vehicle sensor system from FIG. 1 in accordance with an example embodiment.

FIG. 3 is a block diagram of vehicle sensor system 120 from FIG. 1 in accordance with an example embodiment. As previously described, vehicle sensor system 120 may include any number of sensors, instruments, gauges, processors, or other types of devices or systems, or a combination thereof for providing information 126. These devices or systems may be located internally or externally with respect to vehicle 110.

Information 126 provided by vehicle sensor system 120 may include, for example, at least one of position information 302, driver behavior information 304, vehicle status information 306, or environmental information 308. Position information 302 may include GPS coordinates (e.g., latitude and longitude). Position information 302 may be generated using, for example, a position sensor coupled to vehicle 110. In one or more examples, position information 302 may be generated using a GPS sensor integrated with or within the DCM of vehicle 110.

Driver behavior information 304 may include at least one of lane information 310, consistency information 312, steering wheel information 314, brake information 316, or other types of information. Lane information 310 indicates how much vehicle 110 is swerving between lanes. Consistency information 312 provides an indication of how consistently the driver is driving vehicle 110. Steering wheel information 314 provides an indication of how the driver is handling the steering wheel of vehicle 110. Brake information 316 provides an indication of how often the driver is braking. Driver behavior information 304 may be generated using the data provided by any number of sensors including, but not limited to, at least one of a brake sensor, a position sensor, an inertial measurement unit (IMU), a steering wheel sensor, an imaging device, or some other type of sensor device or instrument.

In some examples, driver behavior information 304 includes driver state information 317. Driver state information 317 provides an indication of the state of the driver. The state of a driver may include, for example, a mood of the driver, a hunger level of the driver, a thirst level of the driver, a level of fatigue of the driver, or a combination thereof. Driver state information 317 may be generated based on the data provided by a number of sensors including, but not limited to biometric sensors and imaging sensors. For example, imaging sensors along with facial recognition technology and gesture recognition technology may be used to identify a mood of the driver. In some cases, a driver's facial expressions may indicate that the driver is hungry. In some cases, imaging data capturing a driver licking his or her lips more frequently than usual may be used to indicate that the driver is thirsty.

As shown in FIG. 3, vehicle status information 306 may include at least one of speed 318, fuel level 320, oil level 322, windshield wiper fluid level 324, brake condition 326, tire pressure data 328, air filter condition 330, time remaining to next maintenance check 332, vehicle mechanical metrics 334, vehicle electrical metrics 336, or other types of information about the state of vehicle 110. Speed 318 may be provided by a speedometer. Fuel level 320 may be provided by a fuel gauge. Oil level 322 may be provided by an oil pressure gauge. Windshield wiper fluid level 324 may be provided by a windshield wiper fluid gauge. Brake condition 326 may be provided by any number of brake sensors, including mechanical and electrical brake sensors. Tire pressure data 328 may be provided by any number of tire pressure sensors associated with the tires of vehicle 110. Air filter condition 330 may be provided by an air filter sensor. Time remaining to next maintenance check 332, vehicle mechanical metrics 334, and vehicle electrical metrics 336 may be provided using a clock and any number of sensors monitoring the mechanical, electrical, and electromechanical components of vehicle 110. In other illustrative examples, at least one of speed 318, fuel level 320, oil level 322, windshield wiper fluid level 324, brake condition 326, tire pressure data 328, air filter condition 330, time remaining to next maintenance check 332, vehicle mechanical metrics 334, or vehicle electrical metrics 336 may be provided by one or more sensors, instruments, gauges, devices, or combination thereof, other than those described above.

Environmental information 308 may include, for example, environment imaging data 338, outside temperature data 340, other types of information about an environment around vehicle 110, or a combination thereof. Environment imaging data 338 may be imaging data generated by, for example, one or more imaging devices coupled to vehicle 110. In one or more examples, at least a portion of these imaging devices may be attached to an exterior of vehicle 110 and faced outwards such that environment imaging data 338 captures any number of road conditions, road signs, other vehicles around vehicle 110, other structures around vehicle 110, or combination thereof that may be used to help customize notifications for vehicle 110. In some cases, environment imaging data 338 may be used to provide information about the weather conditions around vehicle 110 (e.g., rain, snow, sleet, hail, icy conditions, fog, etc.).

Outside temperature data 340 may be generated using, for example, an external or outdoor thermometer coupled to vehicle 110. Outside temperature data 340 may include, for example, an outside temperature (relative to vehicle 110).

Figure 4:
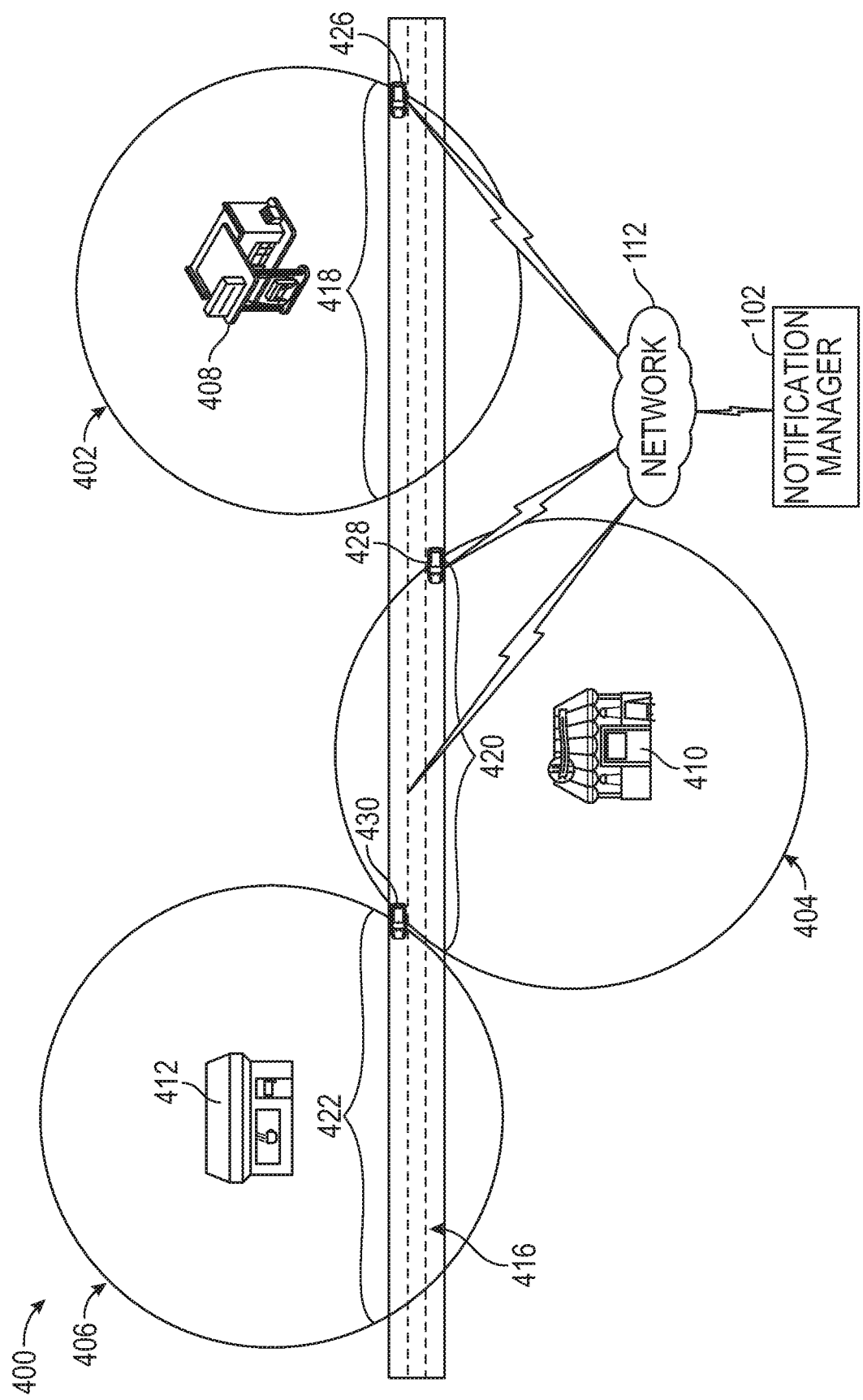
FIG. 4 is an illustration of multiple geo-fences in accordance with an example embodiment.

FIG. 4 is an illustration of multiple geo-fences 400 in accordance with an example embodiment. Geo-fences 400 include geo-fence 402, geo-fence 404, and geo-fence 406, and are described with respect to an example of one implementation for notification system 100 from FIG. 1. Geo-fence 402 has been defined with respect to gas station 408. Geo-fence 404 has been defined with respect to restaurant 410. Geo-fence 406 has been defined with respect to coffee shop 412. Each of gas station 408, restaurant 410, and coffee shop 412 may be associated with a corresponding entity system, such as one of entity systems 116 in FIG. 1. Although not illustrated, these corresponding entity systems may be in communication with notification manager 102 via network 112. Further, these corresponding entity systems may have uploaded notification material that is stored in, for example, database 104 described in FIGS. 1 and 2.

A portion of each of geo-fences 400 overlaps with roadway 416. In particular, portion 418 of roadway 416 is overlapped by geo-fence 402. Portion 420 of roadway 416 is overlapped by geo-fence 404. Further, portion 422 of roadway 416 is overlapped by geo-fence 406.

Vehicles 426, 428, and 430 are driving along roadway 416. Vehicles 426, 428, and 430 may each have a vehicle sensor system similar to vehicle sensor system 120 described in FIGS. 1 and 3. Each of these vehicle sensor systems sends information to notification manager 102 periodically or continuously over network 112. For each of vehicles 426, 428, and 430, this information includes position information indicating a position of the vehicle and driver behavior information indicating the driver behavior corresponding to the driver of that vehicle.

When notification manager 102 detects that vehicle 426 has intersected with geo-fence 402, notification manager 102 determines that a notification condition has occurred or has been triggered. A vehicle may intersect a geo-fence when the vehicle enters the geo-fence, exits the geo-fence, or is positioned on the edge of the geo-fence. Upon detecting that vehicle 426 has intersected with geo-fence 402, notification manager 102 may then select a notification, such as notification 128 described in FIG. 1, from notification material 115 stored in database 104 for presentation in vehicle 426. This notification may be presented to the driver visually on a display device in vehicle 426, audibly through a speaker system in vehicle 426, or both. In one example, this notification may be a coupon for discounted gas at gas station 408. In this illustrative example, the notification is selected and sent based on the position information for vehicle 426 relative to geo-fence 402.

When notification manager 102 detects that vehicle 428 has intersected with geo-fence 404, notification manager 102 determines that a notification condition has occurred or has been triggered. Notification manager 102 may then select a notification, such as notification 128 described in FIG. 1, for presentation in vehicle 428. This notification may be presented to the driver visually on a display device in vehicle 428, audibly through a speaker system in vehicle 428, or both. In one example, this notification may be a marketing notification promoting the food at restaurant 410. In this illustrative example, the notification is selected and sent based on the position information for vehicle 428 relative to geo-fence 404 and driver behavior information indicating that the driver may be hungry or thirsty.

When notification manager 102 detects that vehicle 430 has intersected with geo-fence 406, notification manager 102 determines that a notification condition has occurred or has been triggered. Notification manager 102 may then select a notification, such as notification 128 described in FIG. 1, for presentation in vehicle 430. This notification may be presented to the driver visually on a display device in vehicle 430, audibly through a speaker system in vehicle 430, or both. In one example, this notification may be a marketing notification promoting coffee shop 412. In this illustrative example, the notification is selected and sent based on the position information for vehicle 430 relative to geo-fence 406 and driver behavior information indicating that the driver appears sleepy or that the driver is swerving between lanes, thereby indicating possible driver fatigue.

Figure 5:
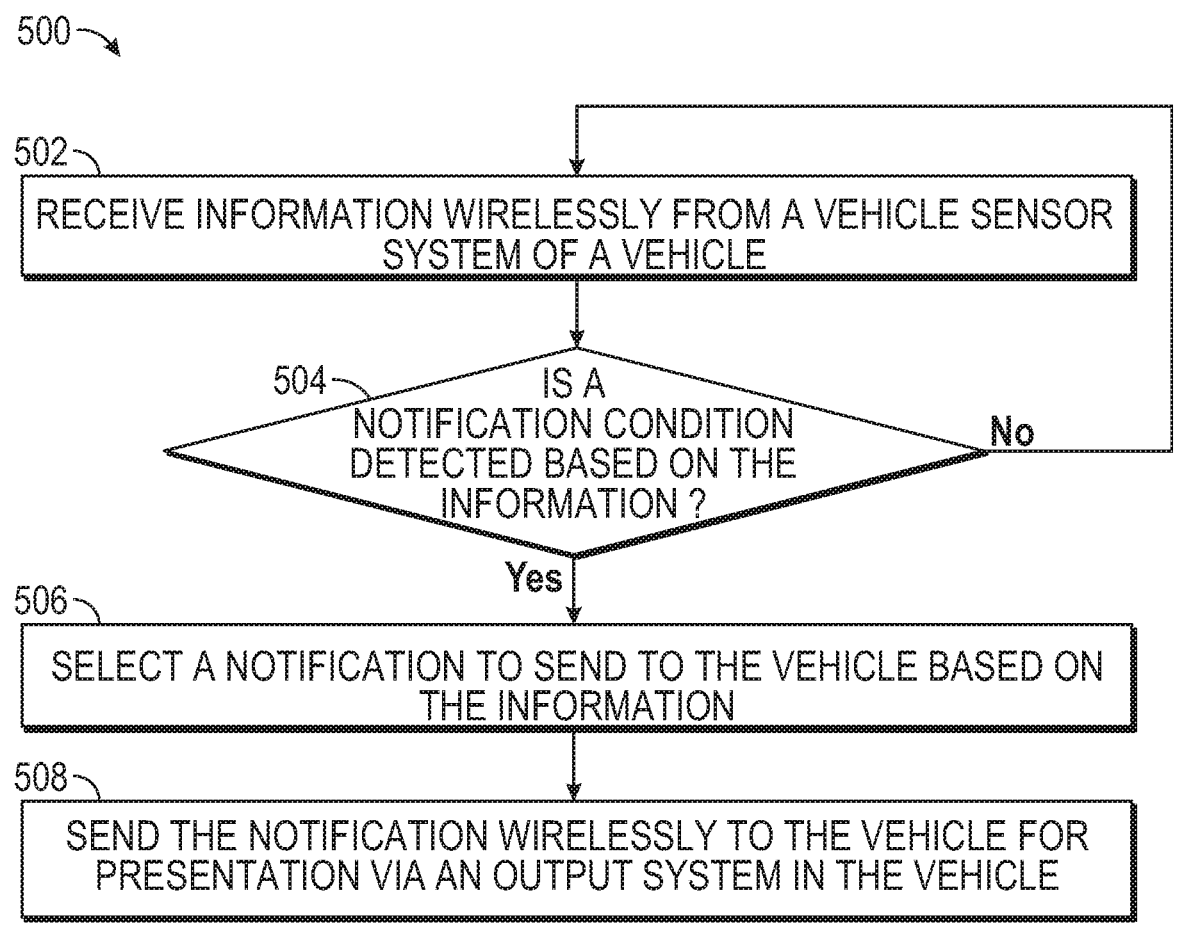
FIG. 5 is a flowchart of a method for managing notifications to be presented in a vehicle in accordance with an example embodiment.

FIG. 5 is a flowchart of a method 500 for managing notifications to be presented in a vehicle in accordance with an example embodiment. Method 500 is illustrated as a set of operations or steps 502 through 508 and is described with continuing reference to FIGS. 1, 2, and 3. Not all of the illustrated steps 502 through 508 may be performed in all embodiments of method 500. Additionally, one or more steps that are not expressly illustrated in FIG. 5 may be included before, after, in between, or as part of the steps 502 through 508. In some embodiments, one or more of the steps 502 through 508 may be implemented, at least in part, in the form of executable code stored on non-transitory, tangible, machine-readable media that when run by one or more processors may cause the one or more processors to perform one or more of the processes. In one or more embodiments, the steps 502 through 508 may be performed by notification system 100 from FIG. 1.

Method 500 may begin by notification system 100 receiving information wirelessly from a vehicle sensor system of the vehicle (step 502). At step 502, a notification manager of notification system 100 receives the information directly or indirectly from the vehicle. For example, in some cases, the vehicle may directly send the information to the notification manager of the notification system 100 wirelessly over a network. In other cases, the vehicle may send the information to a vehicle management system, such as vehicle management system 108 in FIG. 1, over the network. The vehicle management system then sends the information, with or without first processing the information, to the notification manager of notification system 100.

The information received from the vehicle sensor system includes position information and driver behavior information. The position information may include, for example, GPS information (e.g., GPS coordinates of the vehicle). The driver behavior information may include lane information indicating how much the vehicle is swerving between lanes. The driver behavior information may include consistency information indicating how consistently the driver is driving the vehicle. In some examples, the driver behavior information includes steering wheel information indicating how the driver is handling the steering wheel of vehicle. In other examples, the driver behavior information includes brake information indicating how often the driver is braking. The driver behavior information may also include driver state information indicating a state of the driver (e.g., a mood of the driver, whether the driver is hungry or thirsty, whether the driver is fatigued, etc.).

In some examples, the information received at step 502 may also include vehicle status information, environmental information, or both. The vehicle status information may include, for example, at least one of a speed of the vehicle, a fuel level, an oil level, a windshield wiper fluid level, a brake condition, tire pressure data, an air filter condition, a time remaining to next maintenance check, vehicle mechanical metrics, or vehicle electrical metrics for the vehicle. The environmental information may include environment imaging data, outside temperature data, or both.

Notification system 100 determines whether a notification condition is detected based on the information (step 504). Step 504 may be performed by, for example, determining whether the position information received from the vehicle indicates that the vehicle is positioned relative to a predefined geo-fence. As previously described, a geo-fence may be a virtual geographic boundary or virtual perimeter around a particular location. A vehicle may be determined to be positioned relative to a predefined geo-fence when the vehicle is within the geo-fence, has intersected the geo-fence, or is outside the geo-fence but within a preselected range of the geo-fence. A vehicle may intersect a geo-fence when the vehicle enters the geo-fence, exits the geo-fence, or is positioned on the edge of the geo-fence. In this manner, at step 504, a notification condition is detected when the vehicle is determined to be positioned relative to a predefined geo-fence.

If a notification condition is detected, notification system 100 selects a notification to send to the vehicle based on the information (step 506). Step 506 may be performed in a number of different ways. In one or more examples, step 506 includes identifying a plurality of notifications from a database based on the position information received from the vehicle; and selecting the notification from the plurality of notifications based on the driver behavior information. For example, the vehicle may be positioned relative to a predefined geo-fence that is associated with a set of notifications in the database. Notification system 100 selects at least one notification from this set of notifications based on the driver behavior information. In other words, notification system 100 edits or tailors the set of notifications to provide a customized notification or notifications to the driver of the vehicle.

In some examples, step 506 includes selecting the notification based on the driver behavior information and at least one of the vehicle status information or the environmental information. In other examples, step 506 may include selecting the notification based on the driver behavior information and at least one of weather data received from a weather source or traffic data received from a traffic source. The weather source and the traffic source may be external sources. In still other examples, step 506 may include selecting the notification based on the driver behavior information and some combination of the vehicle status information, the environmental information, the weather data received from the weather source, and the traffic data received from the traffic source.

Notification system 100 sends the notification wirelessly to the vehicle for presentation via an output system in the vehicle (step 508). In some examples, the notification is a display notification designed for display on a display device in the vehicle. In other examples, the notification is an audio notification to be played through the speaker system of the vehicle.

Referring again to step 504, if no notification condition is detected, method 500 may terminate or return to step 502. By returning to step 502, notification system 100 repeats method 500. In this manner, method 500 may be repeated periodically or continuously to process the information received from the vehicle sensor system of the vehicle.

Figure 6:
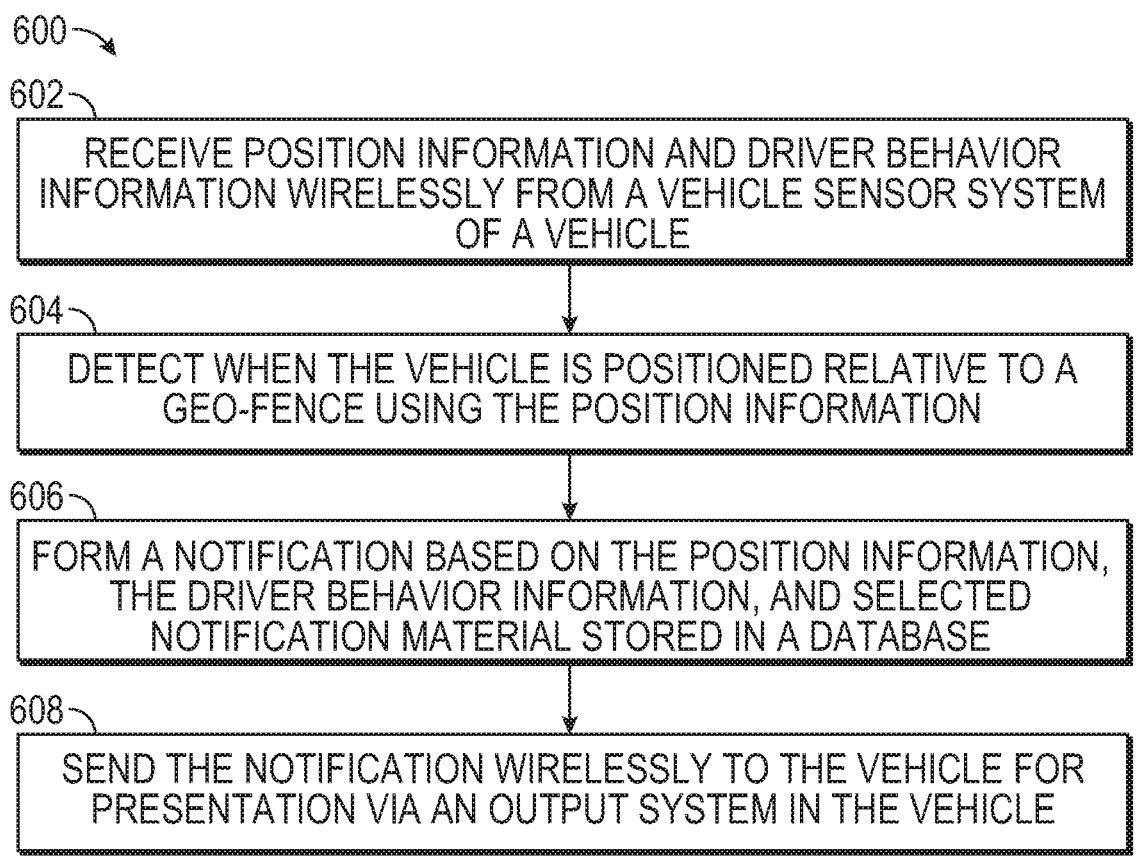
FIG. 6 is a flowchart of a method for managing notifications to be presented in a vehicle in accordance with an example embodiment.

FIG. 6 is a flowchart of a method 600 for managing notifications to be presented in a vehicle in accordance with an example embodiment. Method 600 is illustrated as a set of operations or steps 602 through 608 and is described with continuing reference to FIGS. 1, 2, and 3. Not all of the illustrated steps 602 through 608 may be performed in all embodiments of method 600. Additionally, one or more steps that are not expressly illustrated in FIG. 6 may be included before, after, in between, or as part of the steps 602 through 608. In some embodiments, one or more of the steps 602 through 608 may be implemented, at least in part, in the form of executable code stored on non-transitory, tangible, machine-readable media that when run by one or more processors may cause the one or more processors to perform one or more of the processes. In one or more embodiments, the steps 602 through 608 may be performed by notification system 100 from FIG. 1.

Method 600 may begin by notification system 100 receiving position information and driver behavior information wirelessly from a vehicle sensor system of the vehicle (step 602). Notification system 100 detects when the vehicle is positioned relative to a geo-fence using the position information (step 604). A vehicle may be positioned relative to a geo-fence by being within the geo-fence, intersecting the geo-fence, being just outside the geo-fence, or being within a selected distance from the geo-fence (e.g., within 5000 feet of the geo-fence, within 0.5 miles of the geo-fence, etc.).

Notification system 100 forms a notification based on the position information, the driver behavior information, and selected notification material stored in a database (step 606). At step 606, forming the notification may include creating the notification based on the selected notification material or merely packaging the selected notification material, which may itself be a notification, for sending to the vehicle. In one or more examples, forming the notification includes creating a notification based on template notification information, such as template notification information 212 in FIG. 2. In some illustrative examples, step 606 includes creating the notification based on the selected notification material, the position information, and the driver behavior information and then customizing the notification based on preselected preferences of the driver of the vehicle. For example, the driver may have chosen to opt-into or opt-out of certain types of notifications.

In other illustrative examples, step 606 includes identifying the selected notification material from the database based on the position information. The selected notification material may include a plurality of notifications corresponding to multiple business entities located relative to the geo-fence (e.g., located outside of, located within, or located on the edge of). Step 606 may further include selecting the notification from the plurality of notifications based on the driver behavior information. In some cases, preferences preselected by the driver may also be used to perform this selection.

Notification system 100 sends the notification wirelessly to the vehicle for presentation via an output system in the vehicle (step 608). As previously discussed, the output system of the vehicle may include a display device, a speaker system, or both. Accordingly, the notification may be presented visually on the display device, audibly through the speaker system, or both. In some cases, a particular notification may be customized for only one type of presentation based on driver preferences.

Figure 7:
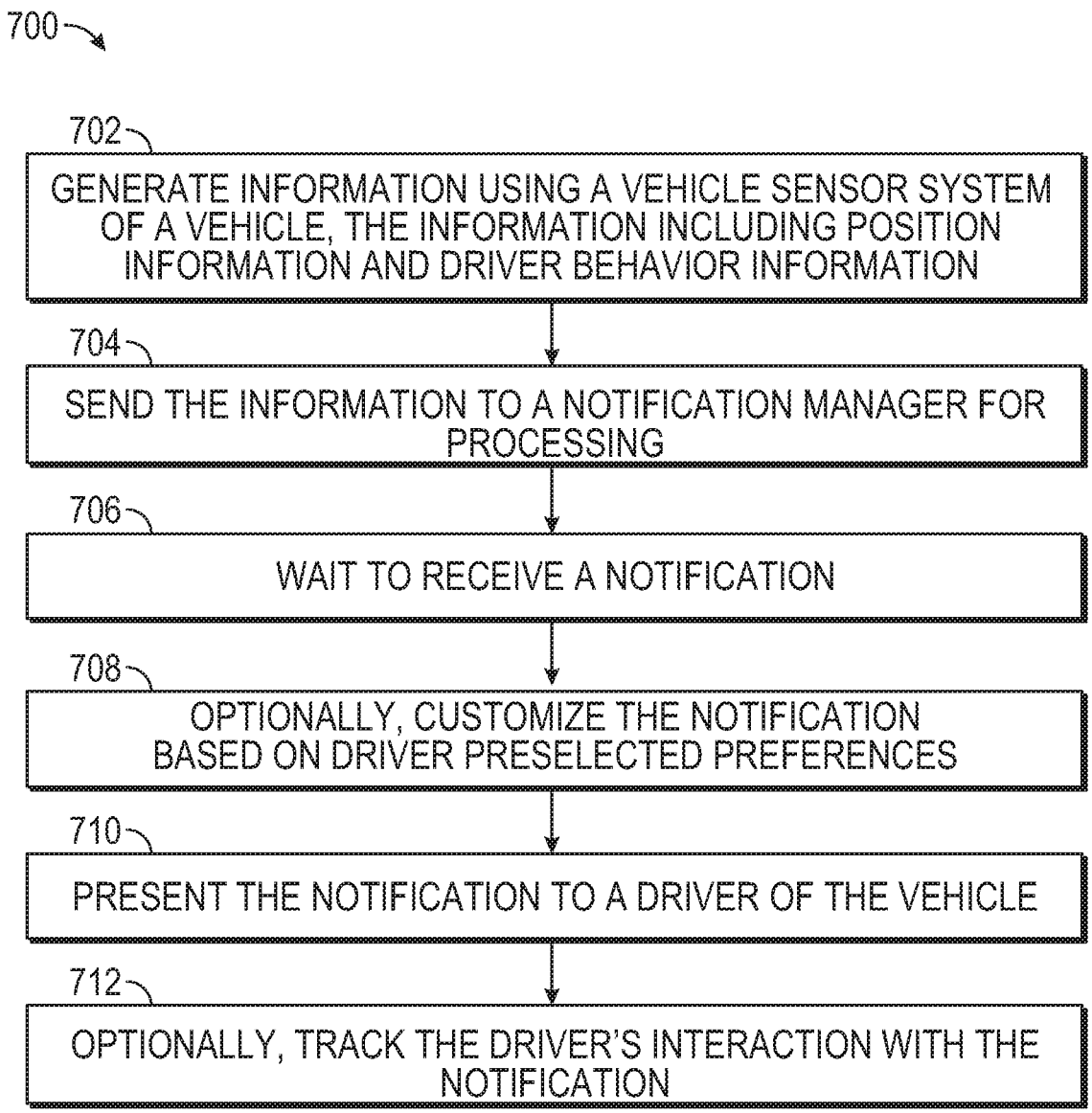
FIG. 7 is a flowchart of a method for managing notifications to be presented in a vehicle in accordance with an example embodiment.

FIG. 7 is a flowchart of a method 700 for presenting notifications in a vehicle in accordance with an example embodiment. Method 700 is illustrated as a set of operations or steps 702 through 712 and is described with continuing reference to FIGS. 1, 2, and 3. Not all of the illustrated steps 702 through 712 may be performed in all embodiments of method 700. Additionally, one or more steps that are not expressly illustrated in FIG. 7 may be included before, after, in between, or as part of the steps 702 through 712. In some embodiments, one or more of the steps 702 through 712 may be implemented, at least in part, in the form of executable code stored on non-transitory, tangible, machine-readable media that when run by one or more processors may cause the one or more processors to perform one or more of the processes. In one or more embodiments, the steps 702 through 712 may be performed by vehicle 110 from FIG. 1.

Method 700 may begin by vehicle 110 generating information using a vehicle sensor system of the vehicle, the information including position information and driver behavior information (step 702). Vehicle 110 then sends the information to a notification manager for processing (step 704). At step 704, the information may be directly sent to the notification manager over a network or may be first sent to a vehicle management system that then sends the information, with or without first processing the information, to the notification manager.

Vehicle 110 waits to receive a notification (step 706). When a notification is received, the notification may include at least one of a marketing notification, a coupon, a deal alert, a marketing prompt, a report, or some other type of notification. Optionally, in response to receiving the notification, vehicle 110 customizes the notification based on driver preselected preferences (step 708). For example, if the notification is meant for display in the vehicle, vehicle 110 may customize the manner in which the notification is displayed based on driver preselected preferences. As another example, if the notification is meant for audio playback in the vehicle, vehicle 110 may choose the volume at which the notification is played to the driver based on driver preselected preferences. In some examples, customizing the notification may include filling out blank fields in the notification based on information about the driver of vehicle 110. For example, the notification may be customized to address the driver by name.

Vehicle 110 then presents the notification to a driver of the vehicle (step 710). At step 710, the notification may be presented visually on a display device of the vehicle or audibly through a speaker system of the vehicle. Optionally, vehicle 110 may track the driver's interaction with the notification (step 712). At step 712, the vehicle 110 may track, for example, whether the driver dismisses the notification, saves the notification for future use, applies the notification to a digital wallet, or uses the notification in some other manner. In some cases, the tracking information that is collected may be used to update the driver's preselected preferences. Further, in some examples, the tracking information that is collected over time may be periodically or continuously sent to the notification manager, the vehicle management system, or both for use in future customization of the notifications that are sent to the vehicle.

In this manner, the different example embodiments described above, and variations thereof, use geo-fencing and advanced vehicle and behavioral computations to send notifications to a vehicle for presentation via an output system of a vehicle. In some cases, the notifications are customized based on a particular driver's preselected preferences. The notification system uses geo-fencing in conjunction with telematics and vehicle-generated information, as well as possibly information from external data sources (e.g., weather data, traffic data, etc.), to make decisions about the types of notifications to send to a vehicle for presentation to the driver of the vehicle. This level of customization provides an enhanced driving experience for the driver of the vehicle.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. A method implemented by a notification system for managing notifications to be presented in a vehicle, the method comprising:
   receiving information wirelessly from a vehicle sensor system of the vehicle, wherein the information includes position information and driver behavior information;
   detecting a notification condition based on the information;
   in response to the detection of the notification condition, identifying a plurality of notifications from a database based on the position information and selecting a notification from the plurality of notifications to send to the vehicle based on the driver behavior information; and
   sending the notification wirelessly to the vehicle for presentation via an output system in the vehicle.

2. The method of claim 1, wherein detecting the notification condition comprises:
   detecting the notification condition in response to a determination that the position information received from the vehicle sensor system indicates the vehicle is positioned relative to a predefined geo-fence.

3. The method of claim 1, wherein the information further includes at least one of vehicle status information or environmental information and wherein selecting the notification from the plurality of notifications comprises:
   selecting the notification from the plurality of notifications based on the driver behavior information and the at least one of the vehicle status information or the environmental information.

4. The method of claim 3, wherein:
   the vehicle status information includes at least one of a speed of the vehicle, a fuel level, an oil level, a windshield wiper fluid level, a brake condition, tire pressure data, an air filter condition, a time remaining to next maintenance check, vehicle mechanical metrics, or vehicle electrical metrics; and
   the environmental information includes at least one of environment imaging data or outside temperature data.

5. The method of claim 1, wherein the driver behavior information indicates at least one of how much the vehicle is swerving between lanes, how consistently a driver is driving the vehicle, how the driver is handling the steering wheel, how often the driver is braking, or a state of the driver.

6. The method of claim 1, further comprising:
   storing notification material received from a plurality of entities in a database, wherein the notification is selected from the notification material.

7. The method of claim 1, wherein the notification includes at least one of a marketing notification, a coupon, a deal alert, a marketing prompt, or a report.

8. The method of claim 1, wherein the output system includes a display device and further comprising:
   displaying the notification on the display device in the vehicle.

9. The method of claim 1, wherein the output system includes a speaker system and further comprising:
   presenting, audibly, the notification to a driver of the vehicle through the speaker system.

10. The method of claim 1, wherein selecting the notification comprises:
    identifying a plurality of notifications from a database based on the position information received from the vehicle; and
    selecting the notification from the plurality of notifications based on the driver behavior information and at least one of weather data received from a weather source or traffic data received from a traffic source.

11. The method of claim 2, wherein determining that the position information indicates the vehicle is positioned relative to the predefined geo-fence comprises determining that the position information indicates the vehicle has entered the predefined geo-fence, has exited from the predefined geo-fence, or is positioned on an edge of the predefined geo-fence.

12. A method implemented by a notification system for managing notifications to be presented in a vehicle, the method comprising:
    receiving, at a notification manager, position information and driver behavior information wirelessly from a vehicle sensor system of the vehicle;
    detecting, by the notification manager, when the vehicle is positioned relative to a geo-fence using the position information;
    forming, by the notification manager, a notification based on the position information, the driver behavior information, and selected notification material stored in a database in response to detecting that the vehicle is positioned relative to the geo-fence, wherein forming, by the notification manager, the notification comprises:
       identifying the selected notification material from the database based on the position information, wherein the selected notification material includes a plurality of notifications corresponding to a plurality of entities located relative to the geo-fence; and
       selecting the notification from the plurality of notifications based on the driver behavior information; and
    sending, by the notification manager, the notification wirelessly to the vehicle for presentation via an output system in the vehicle.

13. The method of claim 12, further comprising:
    receiving, by the vehicle, the notification; and
    displaying, by the vehicle, the notification on a display device in the vehicle.

14. The method of claim 12, wherein forming, by the notification manager, the notification comprises:
    creating the notification based on the selected notification material, the position information, and the driver behavior information, wherein the notification is customized based on preselected preferences of a driver of the vehicle.

15. The method of claim 12, wherein detecting, by the notification manager, when the vehicle is positioned relative to the geo-fence comprises detecting, by the notification manager, that the vehicle has intersected the geo-fence.

16. The method of claim 15, wherein detecting, by the notification manager, that the vehicle has intersected the geo-fence comprises determining, by the notification manager, that the position information indicates the vehicle has entered the predefined geo-fence, has exited from the predefined geo-fence, or is positioned on an edge of the predefined geo-fence.

17. A system for managing notifications to be presented in a vehicle, the system comprising:
a database storing notification material; and
a notification manager configured to:
receive information wirelessly from a vehicle sensor system of the vehicle, the information including position information and driver behavior information;
detect a notification condition based on the information;
in response to the detection of the notification condition, identify a plurality of notifications stored in the database based on the position information and select a notification from the notification material in the database and from the plurality of notifications to send to the vehicle based on the driver behavior information; and
send the notification to the vehicle wirelessly for presentation via an output system in the vehicle.

18. The system of claim 17, wherein the notification manager is configured to detect the notification condition in response to a determination that the position information received from the vehicle sensor system indicates that the vehicle is positioned relative to a predefined geo-fence.

19. The system of claim 17, wherein the driver behavior information indicates at least one of how much the vehicle is swerving between lanes, how consistently a driver is driving the vehicle, how the driver is handling the steering wheel, how often the driver is braking, or a state of the driver.

20. The system of claim 17, wherein the information further includes at least one of vehicle status information or environmental information and wherein:
the vehicle status information includes at least one of a speed of the vehicle, a fuel level, an oil level, a windshield wiper fluid level, a brake condition, tire pressure data, an air filter condition, a time remaining to next maintenance check, vehicle mechanical metrics, or vehicle electrical metrics; and
the environmental information includes at least one of environment imaging data or outside temperature data.

* * * * *